J. MASSEY.
Feed Cutter.
No. 59,043.  Patented Oct. 23, 1866.
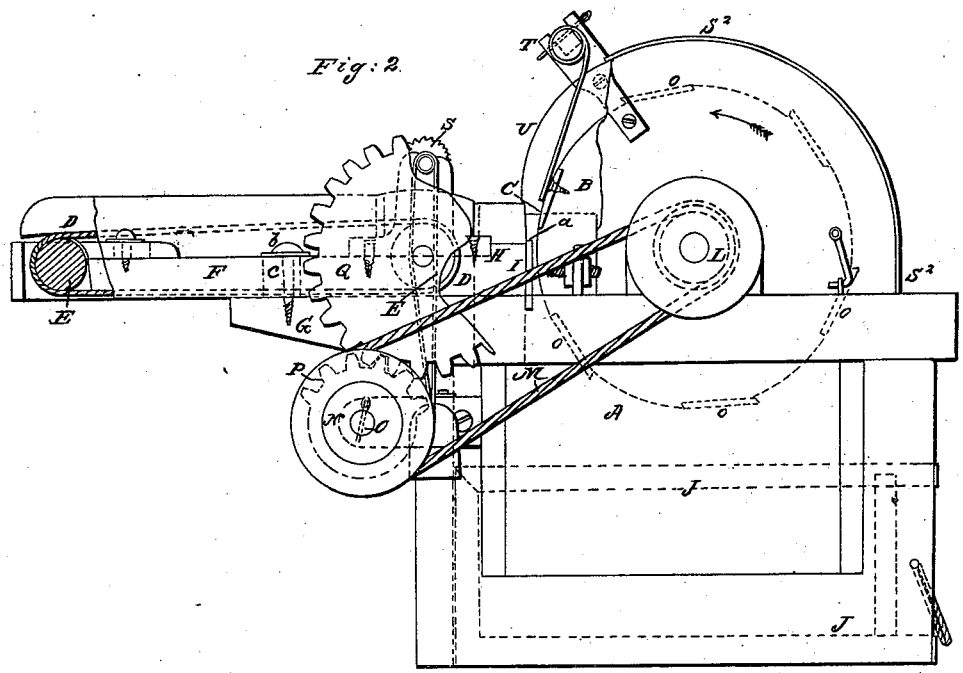
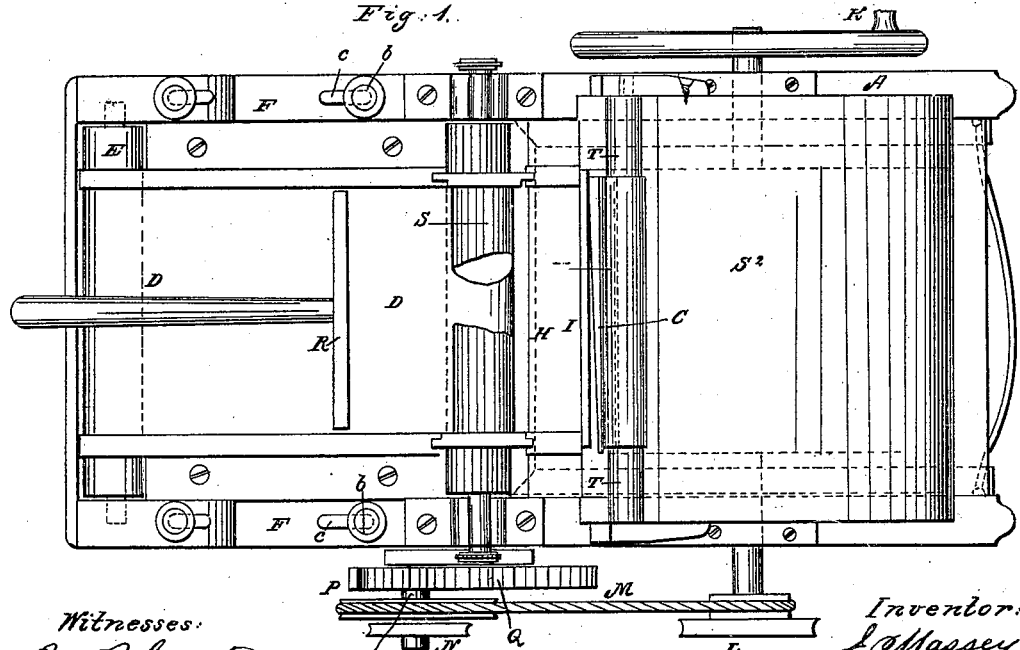

UNITED STATES PATENT OFFICE.

JOHN MASSEY, OF NEW YORK, N. Y.

IMPROVEMENT IN FEED-CUTTERS.

Specification forming part of Letters Patent No. 59,043, dated October 23, 1866.

*To all whom it may concern:*

Be it known that I, JOHN MASSEY, of the city, county, and State of New York, have invented a new and useful Improvement in Feed-Cutters; and I do hereby declare that the following is a full, clear, and exact description thereof, which will enable others skilled in the art to make and use the same, reference being had to the accompanying drawings, forming part of this specification.

The present invention relates to a new and improved machine for cutting feed of all kinds for horses, cattle, and other animals, and also for cutting vegetables and other substances, with which they can be cut with great expeditiousness and facility, as will be apparent from the following detail description thereof, reference being had to the accompanying plate of drawings, of which—

Figure 1 is a plan or top view of the machine or cutter, and Fig. 2 a side elevation, with portions broken out and other parts shown in section.

Similar letters of reference indicate like parts.

A in the drawings represents the frame-work of the machine or feed-cutter, which is to be of any suitable construction to accommodate its various working and operating parts, the frame A being made of hard or any other suitable wood or other material; B, a cylinder placed at one end of the frame-work A, extending across the same and turning in bearings at each end; C, a series of knife-blades or cutters attached to the periphery of the cylinder B, and extending in the direction of its length, but at an angle thereto, the cutting-edges *a* of which knife-blades project a little beyond the surface of the cylinder; D, an endless apron passing around rollers E E at each end, hung and turning in bearings of the horizontal extension-frame F of the main frame-work A of the machine, which frame F is attached to the arms G of the frame-work A by set-screws *b* and slots *c*, so that its inner end, H, can be set nearer to or farther from the cylinder B.

To the inner end, H, of the frame F a cutter-blade, I, is attached, with its cutting-edge up, by which knife I the cutter-blades *c* of the cylinder B, as it is revolved, in turn pass, so that if the hay or other feed or vegetable to be cut is then placed in proper position therefor, it will, as is obvious, be cut by the action of the knives of the revolving cylinder and the fixed or stationary knife, falling down as fast as so cut into the box or drawer J in the bottom of the frame-work A.

The knife-cylinder may be revolved by means of the hands, for which purpose a crank-handle, K, is attached to one end of it; or it may be operated by horse, steam, water, or other power by forming a suitable connection between the two, the revolution of the knife-cylinder at the same time moving the feed-apron along toward it, and consequently carrying the material placed therein to its knives to be acted upon by them, by means of the pulley L of one end of the cylinder and endless connecting-belt M, passing around it and pulley N, hung and turning upon the fixed arm O of one side of the frame-work A, to which latter pulley N is attached, or forming a part of it, a pinion-gear, P, interlocking with a gear-wheel, Q, upon one end of the inner roller of the two apron-rollers.

R, a pusher for sliding the material upon the feed-apron up and toward the knife-cylinder, and for holding the same in close connection therewith, and while being operated upon by its knives or cutters; S, a pressure-roller, hung in bearings of the endless-apron frame, and extending across from one of its sides to the other, which pressure-roller is weighted at each end, but can play up and down, the use of this pressure in many cases serving to increase the efficiency of the machine in the cutting of hay and other feeds, as it is thus fed along with much more uniformity and regularity to the knife-cylinder.

In the cutting of vegetables, such as carrots, &c., the thickness of the slices into which it is cut will depend upon the width of the space between the cutting-edges of the cylinder-knives and the surface of the cylinder, so that by increasing or decreasing such width in any proper manner—as, for instance, by interposing and fixing sectional pieces between the several knives upon the cylinder-periphery—slices of a greater or less thickness can be cut, as is obvious without any further explanation.

S², a cover or roof partially inclosing the upper portion of the knife-cylinder, and secured to the frame-work A in any suitable manner, so that it can be readily detached therefrom or attached thereto at pleasure; T, a roller hung on the cylinder-cover S², from which extends a cloth, U, resting upon the cylinder, which cloth it is intended to saturate sufficiently with oil or other suitable lubricating medium for oiling the knife-blades of the cylinder as it revolves, and thus cause them to cut more easily through the hay or other material fed to the same by the endless apron, as well as to thereby retain the cutting-edges of the knives sharp for a considerable length of time, and obviating the frequent necessity of regrinding them.

I claim as new and desire to secure by Letters Patent—

The adjustable frame F, in combination with the knife I, arranged with the revolving knife-cylinder B, constructed and operating in the manner and for the purpose herein specified.

The above specification of my invention signed by me this 8th day of January, 1866.

JOHN MASSEY.

Witnesses:
M. M. LIVINGSTON,
ALBERT W. BROWN.